(12) United States Patent
Vik et al.

(10) Patent No.: US 7,472,599 B2
(45) Date of Patent: Jan. 6, 2009

(54) STRAIN SENSING DEVICE

(75) Inventors: Timothy A. Vik, Hopewell, IL (US); Jeffry N. Sundermeyer, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 13 days.

(21) Appl. No.: 11/477,857

(22) Filed: Jun. 30, 2006

(65) Prior Publication Data

US 2008/0011085 A1 Jan. 17, 2008

(51) Int. Cl.
*G01B 17/02* (2006.01)

(52) U.S. Cl. ............... 73/627; 73/862.627; 73/862.631; 73/862.041; 73/767

(58) Field of Classification Search ............... 73/627, 73/635, 767, 768, 862.041, 862.043–862.045, 73/862.627, 862.631
See application file for complete search history.

(56) References Cited

U.S. PATENT DOCUMENTS

| | | | |
|---|---|---|---|
| 3,350,926 A | 11/1967 | Webb | |
| 4,280,363 A | 7/1981 | Johansson | |
| 4,336,595 A | 6/1982 | Adams et al. | |
| 4,412,456 A | 11/1983 | Wilhelm et al. | |
| 4,526,044 A | 7/1985 | Moser et al. | |
| 4,680,585 A | 7/1987 | Fasching | |
| 4,738,135 A | 4/1988 | Cadwell et al. | |
| 4,815,547 A * | 3/1989 | Dillon et al. | 177/25.14 |
| 4,872,349 A * | 10/1989 | Espiritu-Santo | 73/727 |
| 5,019,760 A | 5/1991 | Chu et al. | |
| 5,019,814 A | 5/1991 | Biggs et al. | |
| 5,041,976 A | 8/1991 | Marko et al. | |
| 5,070,458 A | 12/1991 | Gilmore et al. | |
| 5,184,516 A | 2/1993 | Blazic et al. | |
| 5,284,062 A | 2/1994 | Ryffel | |
| 5,353,645 A | 10/1994 | Feldman et al. | |

(Continued)

FOREIGN PATENT DOCUMENTS

| | | |
|---|---|---|
| DE | 44 08 923 | 9/1995 |
| EP | 0 291 344 | 11/1988 |
| GB | 1 518 359 | 7/1978 |
| GB | 2 387 911 | 10/2003 |
| GB | 2 417 322 | 2/2006 |
| JP | 62194430 | 8/1987 |
| JP | 04042027 | 2/1992 |
| JP | 09236479 | 9/1997 |
| JP | 2005140653 | 6/2005 |
| WO | WO 03/008925 A1 | 1/2003 |
| WO | WO 2006/067442 | 6/2006 |

OTHER PUBLICATIONS

Product Information Sheet, Micro Stress Analysis and Forecasted Endurance, MicroSAFE™, Invocon, Inc., Technology Profile Mar. 2004, available at www.invocon.com.

(Continued)

*Primary Examiner*—Edward Lefkowitz
*Assistant Examiner*—Freddie Kirkland, III
(74) *Attorney, Agent, or Firm*—Finnegan, Henderson, Farabow, Garrett & Dunner

(57) ABSTRACT

A strain sensing device is provided, which may include a hollow, cylindrical member having an inner surface and an outer surface. The outer surface may have an outer diameter corresponding approximately in size to an inner diameter of an inner surface of a cylindrical bore of a structural component configured to undergo mechanical loading. The hollow, cylindrical member may be configured to mate to the inner surface of the cylindrical bore of the structural component such that strain in the structural component is translated into strain in the hollow, cylindrical member. The strain sensing device may also include one or more strain sensing elements attached to the inner surface of the hollow, cylindrical member and configured to detect strain exhibited by the hollow, cylindrical member.

19 Claims, 2 Drawing Sheets

U.S. PATENT DOCUMENTS

| | | | |
|---|---|---|---|
| 5,402,689 | A | 4/1995 | Grogan |
| 5,531,122 | A | 7/1996 | Chatham et al. |
| 5,598,738 | A | 2/1997 | Buescher, Jr. et al. |
| 5,684,254 | A | 11/1997 | Nakazaki et al. |
| 5,723,779 | A | 3/1998 | Hara et al. |
| 5,726,744 | A * | 3/1998 | Ferdinand et al. ............. 356/32 |
| 5,774,376 | A | 6/1998 | Manning |
| 5,854,993 | A | 12/1998 | Grichnik |
| 5,872,316 | A | 2/1999 | Duggirala et al. |
| 5,970,393 | A | 10/1999 | Khorrami et al. |
| 6,006,163 | A | 12/1999 | Lichtenwalner et al. |
| 6,012,337 | A | 1/2000 | Hodge |
| 6,014,896 | A | 1/2000 | Schoess |
| 6,052,925 | A | 4/2000 | Reiners |
| 6,076,405 | A | 6/2000 | Schoess |
| 6,082,203 | A * | 7/2000 | Koivisto et al. ........ 73/862.627 |
| 6,125,333 | A | 9/2000 | Pun |
| 6,155,292 | A | 12/2000 | Kurata |
| 6,181,841 | B1 | 1/2001 | Hodge |
| 6,192,759 | B1 | 2/2001 | Schoess |
| 6,240,343 | B1 | 5/2001 | Sarangapani et al. |
| 6,273,613 | B1 * | 8/2001 | O'Brien et al. ............. 384/448 |
| 6,292,108 | B1 | 9/2001 | Straser et al. |
| 6,370,964 | B1 | 4/2002 | Chang et al. |
| 6,396,262 | B2 | 5/2002 | Light et al. |
| 6,433,629 | B2 | 8/2002 | Hamel et al. |
| 6,476,377 | B1 | 11/2002 | Hodge |
| 6,480,792 | B1 | 11/2002 | Prendergast |
| 6,487,914 | B1 | 12/2002 | Hodge |
| 6,499,368 | B2 | 12/2002 | Arms et al. |
| 6,529,127 | B2 | 3/2003 | Townsend et al. |
| 6,533,502 | B2 | 3/2003 | McVay et al. |
| 6,556,288 | B1 | 4/2003 | Chovan |
| 6,588,282 | B2 | 7/2003 | Arms |
| 6,617,963 | B1 | 9/2003 | Watters et al. |
| 6,622,567 | B1 | 9/2003 | Hamel et al. |
| 6,647,161 | B1 | 11/2003 | Hodge |
| 6,693,548 | B2 | 2/2004 | Boyce et al. |
| 6,703,600 | B1 | 3/2004 | Hodge |
| 6,714,763 | B2 | 3/2004 | Hamel et al. |
| 6,718,268 | B2 | 4/2004 | Fantana et al. |
| 6,768,065 | B2 | 7/2004 | Bertenburg et al. |
| 6,768,312 | B2 | 7/2004 | Sun et al. |
| 6,858,809 | B2 | 2/2005 | Bender |
| 6,973,838 | B2 | 12/2005 | Denis |
| 2002/0050925 | A1 | 5/2002 | Arms et al. |
| 2002/0128751 | A1 | 9/2002 | Engstrom et al. |
| 2002/0154029 | A1 | 10/2002 | Watters et al. |
| 2002/0190723 | A1 | 12/2002 | Sun et al. |
| 2003/0009300 | A1 | 1/2003 | Giurgiutiu |
| 2003/0036891 | A1 | 2/2003 | Aragones et al. |
| 2003/0071615 | A1 | 4/2003 | Schlicker et al. |
| 2003/0093242 | A1 | 5/2003 | Olsson |
| 2003/0164700 | A1 | 9/2003 | Goldfine et al. |
| 2003/0172740 | A1 * | 9/2003 | Stevenson et al. ............. 73/794 |
| 2003/0173958 | A1 | 9/2003 | Goldfine et al. |
| 2004/0025595 | A1 | 2/2004 | Brennan |
| 2004/0078170 | A1 | 4/2004 | Di Marzio |
| 2004/0078662 | A1 | 4/2004 | Hamel et al. |
| 2004/0113790 | A1 | 6/2004 | Hamel et al. |
| 2004/0122618 | A1 | 6/2004 | Suzuki et al. |
| 2004/0153270 | A1 | 8/2004 | Yamashita et al. |
| 2004/0204278 | A1 | 10/2004 | Olsson |
| 2004/0260512 | A1 | 12/2004 | Olsson |
| 2005/0017602 | A1 | 1/2005 | Arms et al. |
| 2005/0021245 | A1 | 1/2005 | Furuno et al. |
| 2005/0025176 | A1 | 2/2005 | Ko et al. |
| 2005/0087235 | A1 | 4/2005 | Skorpik et al. |
| 2005/0089425 | A1 | 4/2005 | Boone et al. |
| 2005/0210340 | A1 | 9/2005 | Townsend et al. |
| 2006/0017545 | A1 | 1/2006 | Volpi et al. |
| 2006/0047232 | A1 | 3/2006 | Boume et al. |

OTHER PUBLICATIONS

Product Information Sheet, Invocon, Inc., Technology Overview, MicroSAFE™, available at http://www.invocon.com/MicroSAFE_tech_overview.html.

Allen et al, "A Structural Health Monitoring System for Earthmoving Machines," IEEE Conference on Electro Information Technology (EIT), May 2005, (5 pages).

Berger et al, "Consideration of Fracture Mechanics Analysis and Defects Dimension Measurement Assessment for the Trans-Alaska Oil Pipeline Girth Welds," vol. II, National Bureau of Standards, National Technical Information Service (NTIS), Dept. of Commerce, Oct. 18, 1976 (141 pages, front and back).

Fash (Ford Motor Co.), Modeling of Shock Absorber Behavior Using Artificial Neural Networks, SAE International, Mar. 17, 2004 (10 pages).

Gundersen et al, "The Use of an Integrated Multiple Neural Network Structure for Simultaneous Prediction of Weld Shape, Mechanical Properties, and Distortion in 6063-T6 and 6082-T6 Aluminum Assemblies," published in Ninth International Conference on Computer Technology in Welding, May 2000, pp. 255-300 (45 pages).

Polanco, "Estimation of Structural Component Loads in Helicopters: A Review of Current Methodologies," DSTO-TN-0239, Dec. 1999 (71 pages).

Sundermeyer et al, "Shield (Structural Health Integrated Electronic Life Determination)," Proceedings of the 5th International Workshop on Structural Health Monitoring, Sep. 2005 (13 pages).

Volvo Construction Equipment Matris, Ref. VOE21 B 1000351, 2004 (4 pages).

Jones, Jerry E., "Meeting in St. Louis on Shield IP Issues," electronic mail communication dated Nov. 9, 2005 (8 pages).

X-33 Integrated Vehicle Health Monitoring (IVHM), Online, http://nesb.larc.nasa.gov/NESB/ndetasks/2000/x-33.html, visited Sep. 3, 2004.

PCT International Search Report mailed Nov. 8, 2006.

Tse et al., A Hybrid Neural Networks based Machine Condition Forecaster and Classifier by using Multiple Vibration Parameters, IEEE, vol. 4, Jun. 3-6, 1996, pp. 2096-2100.

Allen et al, "A Structural Health Monitoring System for Earthmoving Machines," IEEE Conference on Electro Information Technology (EIT), May 22, 2005 with Abstract (total 7 pages).

Polanco, "Estimation of Structural Component Loads in Helicopters: A Review of Current Methodologies," DSTO-TN-0239, Dec. 1999 (40 pages).

Sundermeyer et al, "Shield (Structural Health Integrated Electronic Life Determination)," Proceedings of the 5th International Workshop on Structural Health Monitoring, Sep. 12, 2005 with publication info (total 22 pages).

Khodja et al., Development of Neural Networks module for fault identification in asynchronous machine using various types of references signals, 0-7803-9235, publish Aug. 24, 2005, IEEE, p. 537-542 (abstract showing publication info).

Office Action dated Jun. 5, 2007 in related U.S. Appl. No. 11/227,157.

Office Action dated Jun. 5, 2007 in related U.S. Appl. No. 11/227,155.

Reply to Office Action, including IDS, and Terminal Disclaimer filed in related U.S. Appl. No. 11/227,157 on Sep. 5, 2007.

Notice of Allowance dated Dec. 20, 2007 in related U.S. Appl. No. 11/227,157.

Reply to Office Action dated Sep. 5, 2007 in related U.S. Appl. No. 11/227,155.

Supplemental Information Disclosure Statement dated Sep. 5, 2007 in related U.S. Appl. No. 11/227,155.

Office Action dated Nov. 2, 2007 in related U.S. Appl. No. 11/227,155.

\* cited by examiner

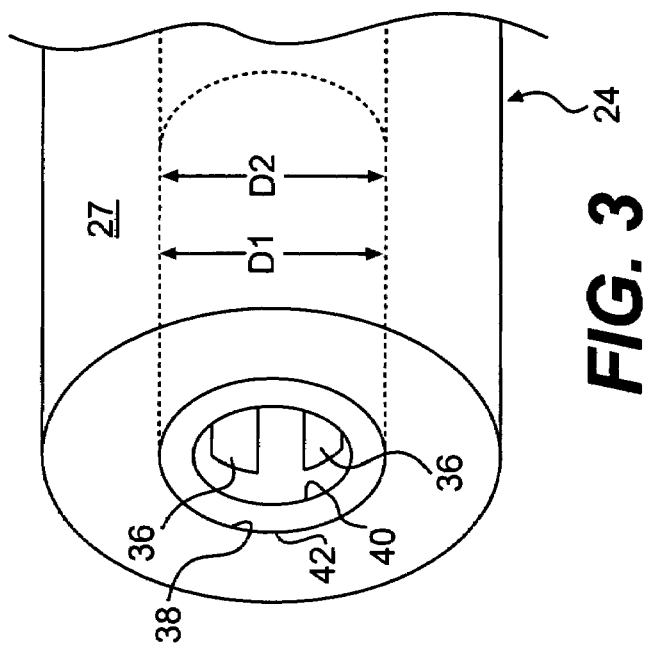
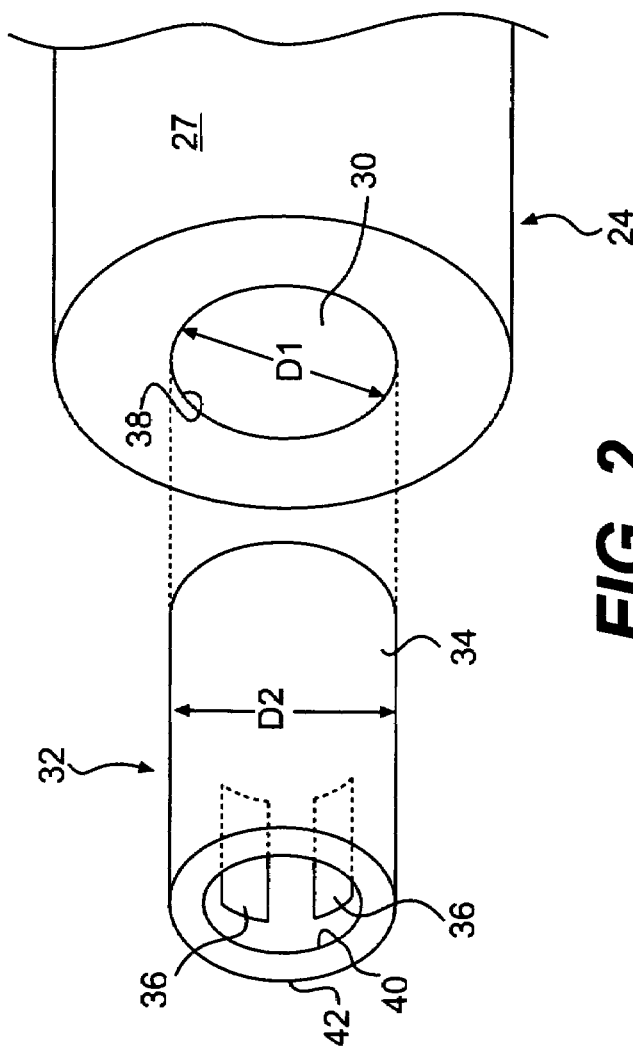

STRAIN SENSING DEVICE

GOVERNMENT RIGHTS

This invention was made with U.S. Government support under cooperative agreement no. 70NANB2H3064 awarded by the National Institute of Standards and Technology (NIST). The U.S. Government has certain rights in the invention.

TECHNICAL FIELD

This disclosure relates generally to a strain sensing device and, more particularly, to a strain sensing device configured to be inserted within a structural component.

BACKGROUND

Machines, such as construction machines (e.g., tractors, dozers, loaders, earth movers, or other such pieces of equipment), may have any number of structural components that are subject to fatigue damage which could lead to structural failures. One method for monitoring fatigue damage on a machine structure is to perform a manual, direct visual inspection to look for actual fatigue damage. However, such a method may be impractical for several reasons. First, such an inspection may not be as comprehensive as desired. This may be due, in part, to the difficulty of accessing some components of the machine, such as when the structure in question is concealed and cannot be viewed without dismantling a portion of the machine. Second, a manual inspection of structural components can only be performed on a periodic basis, yet fatigue damage and resulting catastrophic failure still can occur between inspections. Third, a manual, direct inspection may detect fatigue damage that is manifest by observable cracks, but it may not be able to detect fatigue damage before cracks occur, or predict the remaining fatigue life. While manual inspection may provide some insight into damage that is visible to an inspector, (e.g., large visible cracks in a machine component), internal damage may not be readily apparent through manual inspection (e.g., small internal cracks in a component).

Some systems have been proposed utilizing various ways of monitoring structures electronically to detect fatigue damage. For example, some systems include strain gauges mounted on an exterior surface of a structural component. However, such a mounting location often positions the strain gauges offset from the neutral axis of the structural member, which may result in errors in measuring strain due to bending in the structural component rather than strain (e.g., shear, elongation, torsion). In addition, some machines have structural components that are used in harsh environments. For example, a forestry machine may be operated amongst trees and bushes with branches that can damage externally mounted gauges and related equipment. Systems have been developed that utilize wireless strain sensing devices. However, wirelessly transmitting high volumes of data that result from rapid sampling may not always be practical or possible. In addition, supplying power to such wireless strain sensing devices may also present a challenge.

Other systems have been developed that include internally mounted strain sensing devices. For example, U.S. Pat. No. 6,858,809 to Bender ("the '809 paten") discloses a system including internally mounted strain sensing devices that are configured to take strain measurements. The system of the '809 patent includes a strain sensing element mounted directly to the inner surface of a bore within a hinge pin.

While the system of the '809 patent may provide an internally mounted strain sensing element, mounting of such elements directly to the inner bore can be difficult. The '809 patent offers little detail regarding the structure of such strain sensing devices and little information about how to mount such devices. Retrofitting such devices may present significant challenges, particularly for machines that are not located at or near a facility at which the installation may be performed and/or for machines that are not readily movable to such locations.

The present disclosure is directed to improvements in fatigue evaluation systems.

SUMMARY OF THE INVENTION

In one aspect, the present disclosure is directed to a strain sensing device. The strain sensing device may include a hollow, cylindrical member having an inner surface and an outer surface. The outer surface may have an outer diameter corresponding approximately in size to an inner diameter of an inner surface of a cylindrical bore of a structural component configured to undergo mechanical loading. The hollow, cylindrical member may be configured to mate to the inner surface of the cylindrical bore of the structural component such that strain in the structural component is translated into strain in the hollow, cylindrical member. The strain sensing device may also include one or more strain sensing elements attached to the inner surface of the hollow, cylindrical member and configured to detect strain exhibited by the hollow, cylindrical member.

In another aspect, the present disclosure is directed to a method of installing a strain sensing device in a structural component configured to undergo mechanical loading. The method may include inserting a hollow, cylindrical member into a cylindrical bore in the structural component. The hollow, cylindrical member may include one or more strain sensing elements attached to an inner surface of the hollow, cylindrical member such that the one or more strain sensing elements are configured to detect strain exhibited by the hollow, cylindrical member. The hollow, cylindrical member may have an outer surface having an outer diameter corresponding approximately in size to the inner diameter of the cylindrical bore of the structural component. In addition, the hollow, cylindrical member may be mated to the inner surface of the cylindrical bore of the structural component such that strain in the structural component is translated into strain in the hollow, cylindrical member.

BRIEF DESCRIPTION OF THE DRAWINGS

FIG. 2 is a diagrammatic exploded view of a strain sensing device and structural component to which it may be mated in a manner consistent with certain disclosed embodiments.

FIG. 3 is a view of the strain sensing device in FIG. 2 installed in a structural component.

DETAILED DESCRIPTION

Figure 1:
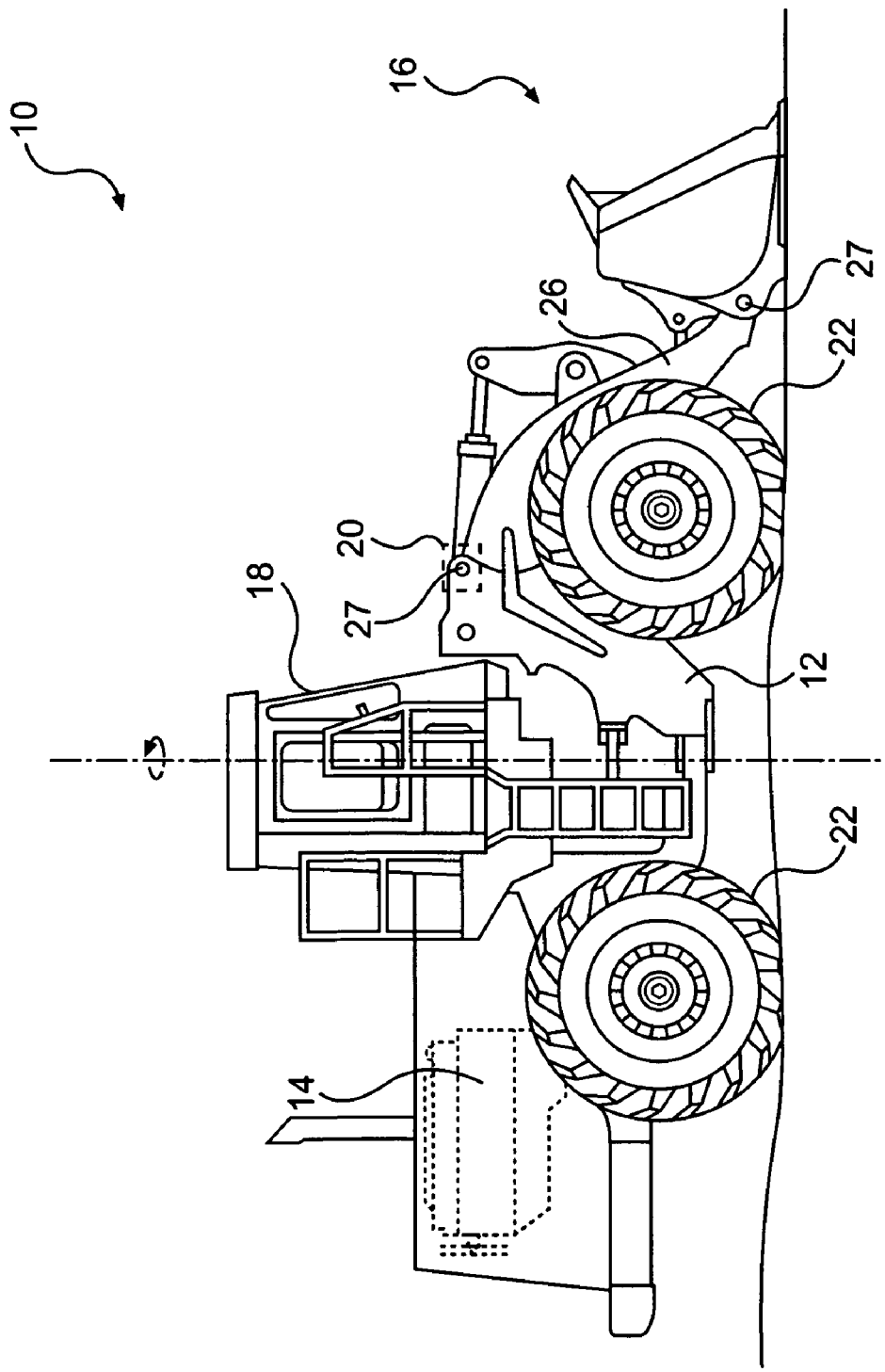
FIG. 1 is a diagrammatic illustration of a machine which may include a strain sensing device according to certain disclosed embodiments.

Reference will now be made in detail to exemplary embodiments and illustrations. Wherever possible, the same reference numbers will be used throughout the drawings to refer to the same or like parts. While specific configurations and arrangements are discussed, it should be understood that this is done for illustrative purposes only.

FIG. 1 illustrates a machine 10. Machine 10 may include a frame 12, power source 14, a work implement 16, an operator station 18, and a structural component 20.

Although machine 10 is shown as a vehicle, machine 10 could be any type of mobile or stationary machine. In the case of a mobile machine, machine 10 may include one or more traction devices 22. Traction devices 22 may be any type of traction devices, such as, for example, wheels, as shown in FIG. 1, tracks, belts, or any combinations thereof.

Power source 14 may be mounted to frame 12 and may include any kind of power source. For example, power source 14 may be an internal combustion engine, such as a gasoline engine, a diesel engine, a gaseous-fuel driven engine or any other exhaust gas producing engine. Alternatively, power source 14 can be an electric motor, or any other kind of power source.

Work implement 16 may include any type of implement or tool configured to facilitate completion of one or more tasks. For example, work implement 16 may include a construction work tool, such as a loader bucket, as illustrated in FIG. 1. Other possible construction work tools may include blades, drill bits, jackhammers, grapples, etc. Work implement 16 may also include other types of tools such as clamps, presses, etc.

Structural component 20 may be configured to undergo mechanical loading. Structural component 20 may be any structural member of machine 10, such as, for example, frame 12, work implement 16, support structure 26 for work implement 16, or any other structural member that may be subjected to mechanical loading. In some embodiments, structural component 20 may include a hinge pin 27, as shown in FIGS. 1-3.

As shown in FIGS. 2 and 3, structural component 20 may include a cylindrical bore 30 configured to receive a strain sensing device 32. Strain sensing device 32 may be configured to measure strain experienced by structural component 20. Strain sensing device 32 may include a hollow, cylindrical member 34 configured to be positioned within cylindrical bore 30, and at least one strain sensing element 36 attached to hollow, cylindrical member 34.

Cylindrical bore 30 may have an inner surface 38 defining an inner diameter D1. Hollow, cylindrical member 34 of strain sensing device 32 may be positioned within cylindrical bore 30 of structural component 20, as illustrated in FIG. 3. Hollow, cylindrical member 34 may have an inner surface 40 and an outer surface 42. Outer surface 42 may have an outer diameter D2 corresponding approximately in size to inner diameter D1 of cylindrical bore 30 of structural component 20. Hollow, cylindrical member 34 may be mated to inner surface 38 of cylindrical bore 30 of structural component 20 such that strain in structural component 20 is translated into strain in hollow, cylindrical member 34. In order to do so, hollow, cylindrical member 34 may be fixed to inner surface 38 of cylindrical bore 30. In some embodiments, outer diameter D2 of hollow, cylindrical member 34 may be sized to provide an interference fit with inner surface 38 of cylindrical bore 30. For example, hollow, cylindrical member 34 may be press fit into cylindrical bore 30. In other embodiments, hollow, cylindrical member 34 may be fixed within the cylindrical bore using adhesive, welding, an ultrasonic attachment method, or any other manner of fixation.

Hollow, cylindrical member 34 may be made from a material compliant enough to mimic the deformation of structural component 20 at node 28 due to the fixation of outer surface 42 of hollow, cylindrical member 34 to inner surface 38 of cylindrical bore 30 in structural component 20. Exemplary materials may include plastics, compliant metals, composites, or any other material that deforms in a linear elastic manner under the types of loading expected to be experienced by structural component 20.

Strain sensing element 36 may be attached to inner surface 40 of hollow, cylindrical member 34. Strain sensing element 36 may be configured to detect strain exhibited by hollow, cylindrical member 34. Strain sensing device 32 may be configured to measure any type of strain. For example, strain sensing device 32 may be configured to measure axial strain, shear strain, torsional strain, or multi-axial strain (e.g., using a rosette type device).

INDUSTRIAL APPLICABILITY

The disclosed strain sensing device may be applicable to any structural component configured to be subjected to mechanical loading. The disclosed device may be configured to measure strain in structural components of machines. The disclosed device may be applicable to stationary machines, such as power generation sets, cranes, lifts, etc., as well as mobile machines, such as construction equipment like loaders, track type tractors (e.g., bulldozers), hauling vehicles, excavators, earthmovers, etc. The disclosed device may be applicable to machines of any size and configured for any task. In some embodiments, the disclosed device may be configured to measure strain in machines having moving parts. In other embodiments, the disclosed device may be used to measure strain in mechanically loaded structures without moving parts.

The disclosed strain sensing device may be used to measure strain in a structural component in which it is inserted and/or in a structural component adjacent to the structural component in which it is inserted. In some embodiments, the disclosed device may be used to determine, based on the collected strain measurements, the loads experienced by structural component 20 and/or structural components adjacent thereto. Alternatively or additionally, the collected strain measurements may be used to determine fatigue in structural component 20 or structural components adjacent thereto. For example, data collected by strain sensing device 32 inserted within hinge pin 27 may be used to determine loading at the pin joint and/or loading in/on support structure 26. Such data may also be used to determine fatigue in support structure 26. Fatigue determinations may be made using methods known to those skilled in the art and may involve analysis of load ranges, mean load, and number of cycles, as well as calculated strain tensor time history at a particular location and/or S-N curves of the material from which structural component 20 is made.

Fatigue data, including collected strain data, calculated strains, loads, etc. may be used to provide estimates of fatigue life and/or fatigue damage for one or more components of machine 10. This information may be used to provide insight regarding the health of machine 10 and to gather information useful for future design improvements of machines. In certain embodiments, the strain measurements taken using strain sensing device 32 and fatigue data determined therefrom may be useful to design future machines, operate machines, to determine resale values based on known wear of machine 10, and/or to determine when to perform maintenance and/or repair. In addition, such data may provide health information that is relevant and useful to a number of entities, including, for example, machine owners, machine operators, machine purchasers, service mechanics, and machine developers and engineers. Such relevant information may include, 1) fatigue damage data, 2) fatigue life predictions, 3) extreme load cases for one or more components, 4) load histories at various severity levels, 5) damage rate data, and 6) crack detection. Information about fatigue damage and/or predicted fatigue life, for example, may be relevant to those purchasing and/or selling machines that have been previously operated.

In certain embodiments, more than one of the disclosed strain sensing device may be employed by a monitoring system configured to store and/or analyze data collected by each strain sensing device. In some embodiments, the disclosed strain sensing device may be associated with one or more controllers for controlling operation of the device and/or processors for processing data collected by the device. The disclosed strain sensing device could also be associated with a memory configured to store data collected by the strain sensing device. Such data may be stored in a raw and/or processed state. The disclosed device may also be associated with a display configured to display collected data in a raw, tabulated, and/or graphical representation.

The positioning of strain sensing device 32 within structural component 20 may position strain sensing element 36 closer to the neutral axis of structural component 20. Such positioning may render system 20 less susceptible to errors that could result from bending deflection of structural component 20 if strain sensing device 32 were to be mounted on the exterior of structural component 20. Additionally, positioning of strain sensing device 32 within structural component 20 may protect strain sensing device 32 from damage due to environmental hazards, such as tree branches, stones, water, etc.

In some embodiments, fatigue evaluation system 20 and, particularly strain sensing device 32 may be modular, such that strain sensing device 32 may be installed and removed from structural component 20. Such embodiments may utilize an interference fit to fix strain sensing device 32 within cylindrical bore 30. Other embodiments may feature a more permanent fixation of strain sensing device 32 within cylindrical bore 30. Such embodiments may utilize fixation such as welding, adhesive, or ultrasonic attachment. Both removable strain sensing devices and those configured to be more permanently installed may be configured to be retrofitted to structural component 20. For example, strain sensing devices 30 may be configured for installation in structural component 20 after manufacturing of structural component 20 has been completed and, in some cases, after manufacturing of machine 10 has been completed. Therefore, system 20 may be fitted to machine 10 after production or after machine 10 has been placed in service.

An exemplary method of installing strain sensing device 32 in structural component 20 may include inserting hollow, cylindrical member 34 into cylindrical bore 30 of hollow, cylindrical member 34 such that one or more strain sensing elements 36 are configured to detect-strain exhibited by hollow, cylindrical member 34. Such a method may include mating or fixing hollow, cylindrical member 34 to inner surface 38 of cylindrical bore 30 such that strain in structural component 20 is translated into strain in hollow, cylindrical member 34. The method may further include pressfitting hollow, cylindrical member 34 into cylindrical bore 30. Additionally or alternatively, the method may include fixing hollow, cylindrical member 34 within cylindrical bore 30 using adhesive, welding, or an ultrasonic attachment method.

It should be noted that it may be desirable, in some situations, to minimize the overall size of strain sensing device 32 in order to maximize the structural integrity of structural component 20. For example, for certain applications, such as hinge pins in construction equipment, structural component 20 may experience significantly high loads. For such applications, strain sensing device 32 should have the smallest practical diameter and/or length. As an example of possible relative proportions between structural component 20 and strain sensing device 32, for a hinge pin having an outer diameter of approximately two inches, a strain sensing device configured for installation therein may have an outer diameter on the order of about ¼ inch (e.g., roughly the size of a pencil).

It will be apparent to those having ordinary skill in the art that various modifications and variations can be made to the disclosed strain sensing device without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. A strain sensing device, comprising:
a hollow, cylindrical member having an inner surface and an outer surface, the outer surface having an outer diameter corresponding approximately in size to an inner diameter of an inner surface of a cylindrical bore of a structural component configured to undergo mechanical loading;
wherein the hollow, cylindrical member is configured to mate to the inner surface of the cylindrical bore of the structural component such that strain in the structural component is translated into strain in the hollow, cylindrical member; and
one or more strain sensing elements attached to the inner surface of the hollow, cylindrical member and configured to detect strain exhibited by the hollow, cylindrical member.

2. The device of claim 1, wherein the outer diameter of the hollow, cylindrical member is sized to provide an interference fit with the inner surface of the cylindrical bore.

3. The device of claim 1, wherein the hollow, cylindrical member is fixed within the cylindrical bore using adhesive.

4. The device of claim 1, wherein the hollow, cylindrical member is fixed within the cylindrical bore using welding.

5. The device of claim 1, wherein the hollow, cylindrical member is fixed within the cylindrical bore using an ultrasonic attachment method.

6. The device of claim 1, wherein the one or more strain sensing elements are configured to detect axial strain, shear strain, bending strain, or torsional strain.

7. The device of claim 6, wherein the one or more strain sensing elements include a rosette configuration configured to measure strain in multiple axes.

8. A method of installing a strain sensing device in a structural component configured to undergo mechanical loading, comprising:
inserting a hollow, cylindrical member into a cylindrical bore in the structural component, the hollow, cylindrical member including one or more strain sensing elements attached to an inner surface of the hollow, cylindrical member such that the one or more strain sensing elements are configured to detect strain exhibited by the hollow, cylindrical member;
wherein the hollow, cylindrical member has an outer surface having an outer diameter corresponding approximately in size to the inner diameter of the cylindrical bore of the structural component; and
wherein the hollow, cylindrical member is mated to the inner surface of the cylindrical bore of the structural component such that strain in the structural component is translated into strain in the hollow, cylindrical member.

9. The method of claim 8, further including pressfitting the hollow, cylindrical member into the cylindrical bore.

10. The method of claim 8, further including fixing the hollow, cylindrical member within the cylindrical bore using adhesive.

11. The method of claim 8, further including fixing the hollow, cylindrical member within the cylindrical bore using welding.

12. The method of claim 8, further including fixing the hollow, cylindrical member within the cylindrical bore using an ultrasonic attachment method.

13. A machine, comprising:
   a power source;
   a structural component configured to undergo mechanical loading and including a cylindrical bore having an inner surface defining an inner diameter; and
   a strain sensing device positioned within the cylindrical bore of the structural component and configured to measure strain in the structural component, the strain sensing device including:
      a hollow, cylindrical member having an inner surface and an outer surface, the outer surface having an outer diameter corresponding approximately in size to the inner diameter of the inner surface of the cylindrical bore of the structural component;
      wherein the hollow, cylindrical member is configured to mate to the inner surface of the cylindrical bore of the structural component such that strain in the structural component is translated into strain in the hollow, cylindrical member; and
      one or more strain sensing elements attached to the inner surface of the hollow, cylindrical member and configured to detect strain exhibited by the hollow, cylindrical member.

14. The machine of claim 13, wherein the outer diameter of the hollow, cylindrical member is sized to provide an interference fit with the inner surface of the cylindrical bore.

15. The machine of claim 13, wherein the hollow, cylindrical member is fixed within the cylindrical bore using adhesive.

16. The machine of claim 13, wherein the hollow, cylindrical member is fixed within the cylindrical bore using welding.

17. The machine of claim 13, wherein the hollow, cylindrical member is fixed within the cylindrical bore using an ultrasonic attachment method.

18. The machine of claim 13, wherein the one or more strain sensing elements are configured to detect axial strain, shear strain, bending strain, or torsional strain.

19. The machine of claim 18, wherein the one or more strain sensing elements include a rosette configuration configured to measure strain in multiple axes.

* * * * *